United States Patent [19]

D'Luna

[11] Patent Number: 5,374,956

[45] Date of Patent: Dec. 20, 1994

[54] ELECTRONIC IMAGING APPARATUS WITH DITHERED COLOR FILTER ARRAY

[75] Inventor: Lionel J. D'Luna, Rochester, N.Y.

[73] Assignee: Eastman Kodak Company, Rochester, N.Y.

[21] Appl. No.: 889,703

[22] Filed: May 29, 1992

[51] Int. Cl.⁵ .................. H04N 3/14; H04N 5/335; H04N 9/04

[52] U.S. Cl. .................................. 348/275; 348/280

[58] Field of Search ............... 358/41, 44, 75, 80, 358/76, 43; 348/273, 274, 275, 276, 277, 280; H04N 9/04, 9/07, 3/14, 5/335

[56] References Cited

U.S. PATENT DOCUMENTS

| | | | |
|---|---|---|---|
| 4,626,901 | 12/1986 | Tanioka | 358/75 |
| 4,663,661 | 5/1987 | Weldy et al. | 358/44 |
| 4,679,073 | 7/1987 | Hayashi | 358/80 |
| 4,734,762 | 3/1988 | Aoki et al. | 358/80 |
| 4,876,590 | 10/1989 | Parulski | 358/41 |
| 4,896,207 | 1/1990 | Parulski | 358/44 |
| 4,962,419 | 10/1990 | Hibbard et al. | 358/37 |
| 4,974,078 | 11/1990 | Tsai | 358/133 |
| 5,001,663 | 3/1991 | Parulski et al. | 364/760 |
| 5,008,739 | 4/1991 | D'Luna et al. | 358/21 |

FOREIGN PATENT DOCUMENTS

| | | | |
|---|---|---|---|
| 58-219889 | 12/1983 | Japan | H04N 9/04 |
| 59-103487 | 6/1984 | Japan | H04N 9/04 |
| 57-212908 | 6/1984 | Japan | H04N 9/04 |
| 60-100676 | 11/1986 | Japan | H04N 9/07 |
| 61-258594 | 11/1986 | Japan | H04N 9/07 |
| 62-53586 | 3/1987 | Japan | H04N 9/07 |
| 60-194290 | 3/1987 | Japan | H04N 9/07 |

OTHER PUBLICATIONS

U.S. Ser. No. 646,130, A Solid State Color Image Sensor Using a Field-Staggered Color Filter Pattern; Michael C. Moorman, Robert H. Hibbard, Kenneth A Parulski.

U.S. Ser. No. 676,910, filed Nov. 30, 1984, a continuation of U.S. Ser. No. 648,998, filed Sep. 10, 1984, both applications now abandoned though cited in the above-mentioned U.S. Pat. No. 4,663,661 (also published as WO86/01678).

*Primary Examiner*—Mark R. Powell
*Assistant Examiner*—Chris Grant
*Attorney, Agent, or Firm*—David M. Woods

[57] ABSTRACT

A color filter array for use with an electronic image sensor is disclosed, wherein the red and blue filter elements of the color filter array are arranged to correspond with an interleaved chrominance channel pattern. Thus, actual red and blue values are utilized to generate interleaved chrominance channel information instead of interpolated values as required by conventional CFA patterns.

3 Claims, 11 Drawing Sheets

ELECTRONIC IMAGING APPARATUS WITH DITHERED COLOR FILTER ARRAY

BACKGROUND OF THE INVENTION

The invention relates in general to the field of electronic color imaging. The invention relates more specifically to electronic imaging devices that utilize a single multi-color image sensor, incorporating a color filter array, to generate both luminance and color information.

It is desirable in the field of electronic imaging to compress electronic image data to reduce the amount of storage space required to store a captured image. In electronic still cameras, for example, image cards have been proposed to store the electronic image data generated by the image sensor of the camera. Reductions in the size and expense of the image cards can be achieved, while at the same time increasing their image storage capability, if electronic image compression techniques are employed to reduce the amount of actual image data that must be stored to subsequently reproduce each image in detail.

Standards for performing image compression have recently been developed. See, for example, JPEG Draft Technical Specification JPEG-8-R5 (January 1990). In addition, devices for performing image compression in accordance with the developed standards, for example the CL550B JPEG Image Compression Processor, available from C-Cube Microsystems, have recently become available. The available devices accept a raster stream of image data, including up to three channels of color information, and then perform all of the necessary formatting tasks to form 8×8 image blocks (for example with the use of eight line buffers) to which further image processing functions are applied.

Using three separate color channels, however, is not desirable, as separate red, green and blue image data (RGB) would have to be generated for each pixel of the image to be captured. If a single sensor with a color filter array is used, this requirement makes the input data three times as large as the sensor resolution. It is possible, however, to utilize a separate luminance channel (G) and to interleave separate chrominance channels (R-G, B-G) into a single chrominance channel in order to reduce the amount of data that must be generated. In such a case, a single image sensor incorporating a color filter array (CFA) could be used to generate the required luminance and interleaved chrominance channel.

The use of single image sensors incorporating CFAs to generate both luminance and color information is well known. Red, green and blue color information is isolated by passing scene light through a color filter having a specific pattern of red, green and blue filter elements before the scene light strikes a photosite sensor element of the image sensor. Information corresponding to all three colors is therefore not measured for each discrete pixel of the image. Instead, information from neighboring pixels must be used, generally through an interpolation process, in order to generate luminance and color differences for each image pixel.

A problem exists with conventional CFA patterns, however, when attempting to create the interleaved chrominance channel described above, namely, actual red and blue values required to generate the interleaved chrominance channel are not always available to match the B-G, R-G, B-G chrominance channel interleave pattern. Interpolated red and/or blue values must therefore be used in place of actual values, which introduces a significant amount of error into the system. It should be noted that interpolation of a red or blue value introduces a higher degree of error than the interpolation of a green value, as the red and blue colors, which are used to generate the chrominance signal, are usually sampled at a much lower frequency than green, which is used to produce the luminance channel.

In view of the above, it is an object of the invention to provide a CFA that can be incorporated in an electronic image sensor that does not require the use of interpolated red and blue values to generate an interleaved chrominance channel.

SUMMARY OF THE INVENTION

The invention provides a color filter array for use with an electronic image sensor, wherein the red and blue filter elements of the color filter array are arranged to correspond with an interleaved chrominance channel pattern. Thus, actual red and blue values are utilized to generate interleaved chrominance channel information instead of interpolated values as required by conventional CFA patterns.

For example, in one preferred embodiment, the color filter array is incorporated in an electronic imaging apparatus that includes an electronic image sensor having a plurality of photosites arranged in a two-dimensional array. The color filter array has a predetermined pattern of red, green and blue filter elements, wherein the red and blue filter elements correspond to a predetermined interleaved chrominance channel pattern, and is located over the two-dimensional array of photosites. A scanning mechanism is provided to scan the image sensor to generate an image output signal. The image output signal is then supplied to a pre-compression processor which processes the image signal to generate a luminance signal and an interleaved chrominance signal corresponding to the interleaved chrominance channel pattern.

BRIEF DESCRIPTION OF THE DRAWINGS

With the above as background, reference should now be made to the following description of the best modes of carrying out the invention and the accompanying drawings, wherein:

FIG. 14 H,B are detailed schematic diagram of the precompression processor incorporated in the electronic camera illustrated in FIG. 13.

BEST MODES OF CARRYING OUT THE INVENTION

Figure 1:
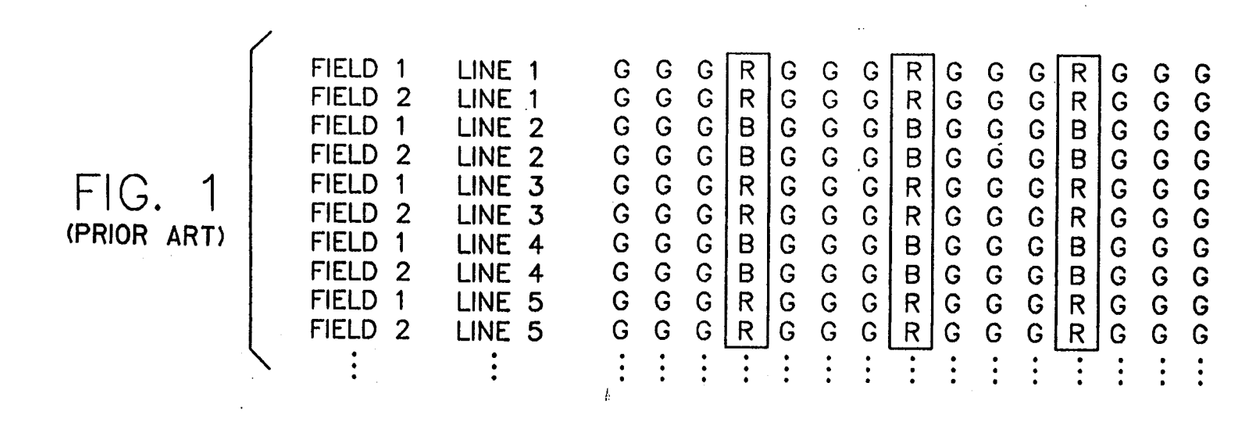
FIG. 1 illustrates a conventional color filter array of a first type generally referred to as a "3-G" color filter array.
Figure 2:
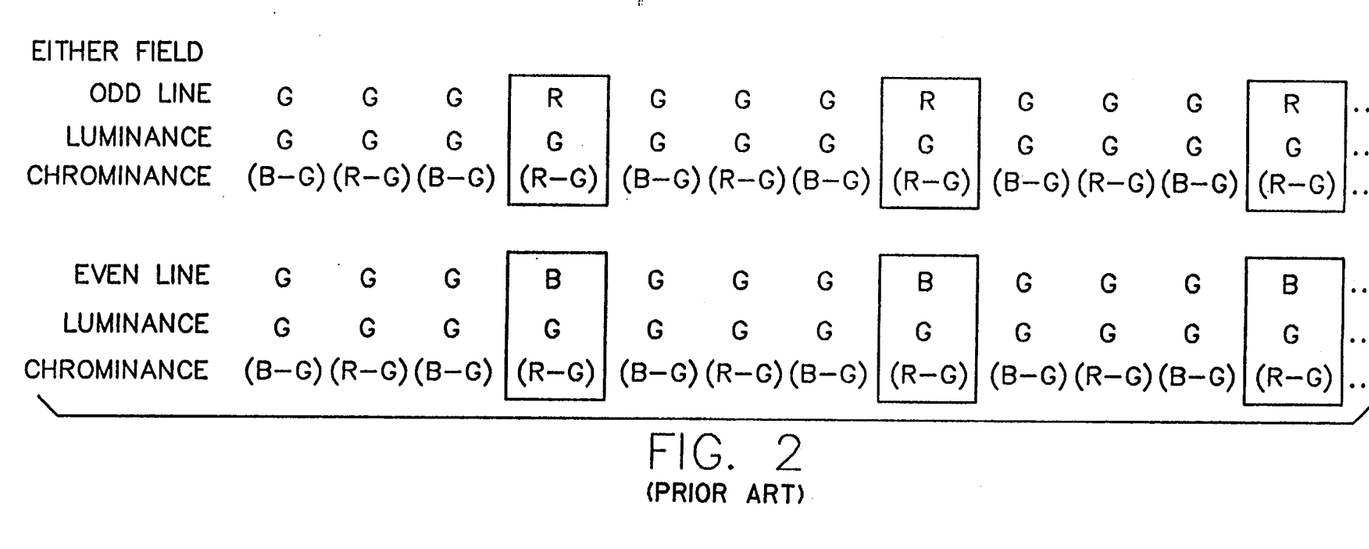
FIG. 2 illustrates the generation of luminance and chrominance information using the color filter array of the type illustrated in FIG. 1.

A conventional CFA of the type generally referred to as a 3-G CFA is illustrated in FIG. 1, wherein alternating rows of the CFA correspond to first and second image fields to be generated by an electronic image sensor underlying the CFA. ("3-G" in this context refers to a CFA having a sequence of three adjacent green filter elements separated by either a "1R" (one red) or a "1B" (one blue) filter element). Image lines within each field alternate between a 3G-1R-3G-1R pattern to a 3G-1B-3G-1B pattern. FIG. 2 illustrates the generation of luminance channel information and interleaved chrominance channel information for either field using the CFA pattern illustrated in FIG. 1. In the case of the luminance channel, actual green values will be generated by the photosites of the image sensor for each of the corresponding green filter elements in the first line, while interpolated green values must be used at the positions where a red filter element is present. In the case of the chrominance channel, selected blue and red values are used to generate the B-G and R-G values corresponding to the location of the first three green filter elements, while an actual red value, generated by a photosite of the image sensor, is used to generate the R-G value corresponding to the red filter element. For the second line, the luminance channel is generated in the same manner as the luminance channel for the first line, i.e., by using an interpolated green values for each of the corresponding blue filter element locations. In the chrominance channel, selected blue and red values are used to generate the B-G, R-G, B-G values for the first three corresponding green filter element locations. At the blue filter element location, however, the chrominance channel requires a R-G value. Thus, an interpolated red value must be supplied to generate the R-G value at the location of the blue filter sight, as the photosite of the image sensor will generate an actual blue signal. As discussed above, this introduces error into the system because an interpolated red value must be used in place of an available actual blue value.

Figure 3:
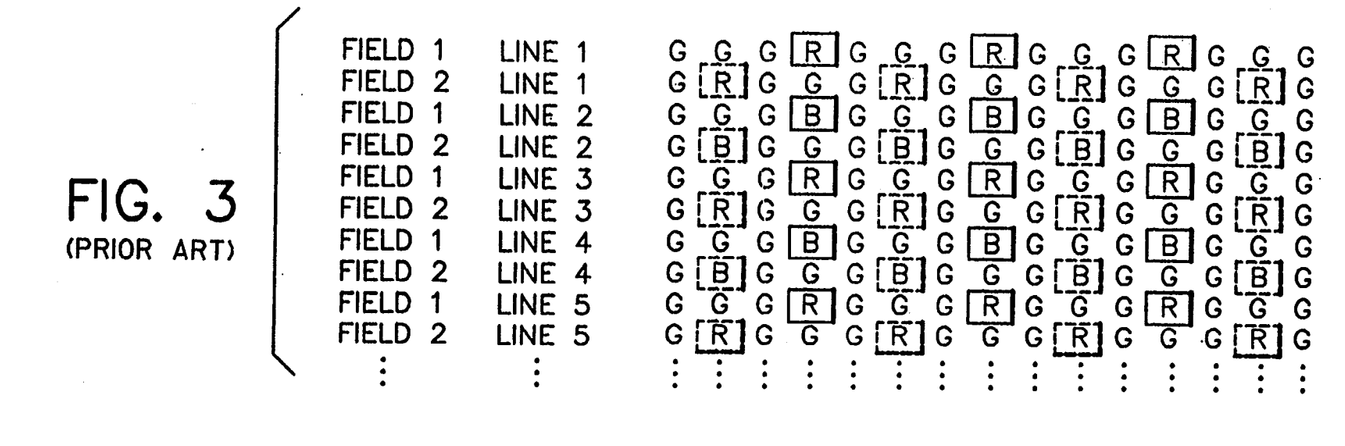
FIG. 3 illustrates a conventional color filter array of a second type generally referred to as a "Field Staggered 3-G" color filter array.
Figure 4:
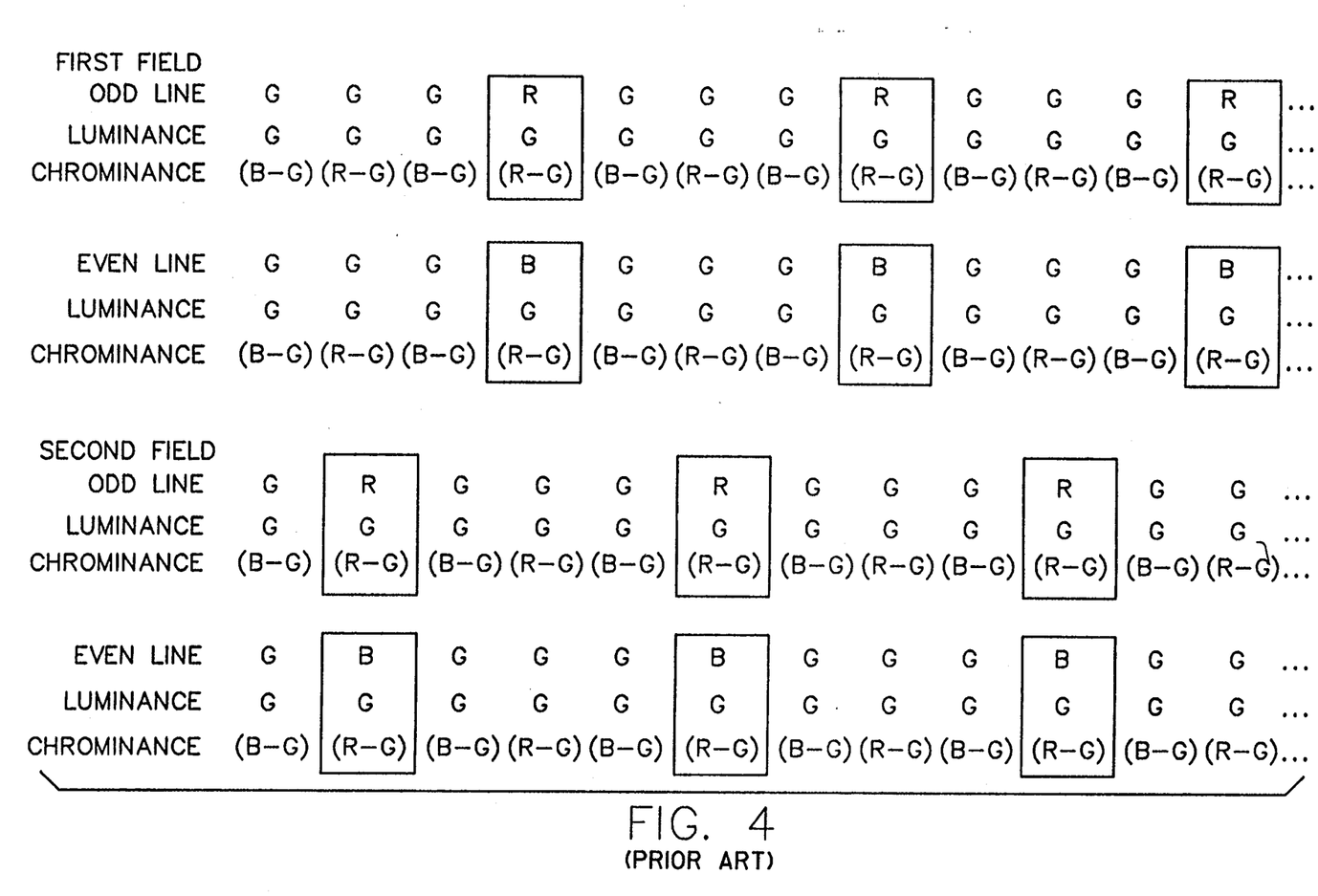
FIG. 4 illustrates the generation of luminance and chrominance information using the color filter array of the type illustrated in FIG. 3.
Figure 5:
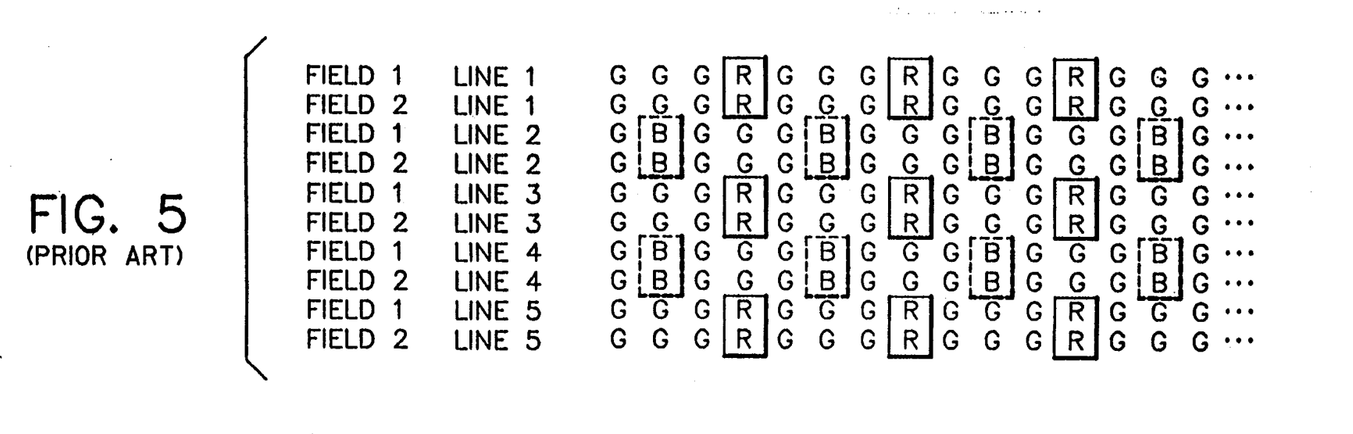
FIG. 5 illustrates a conventional color filter array of a third type generally referred to as a "Staggered 3-G" color filter array.
Figure 6:
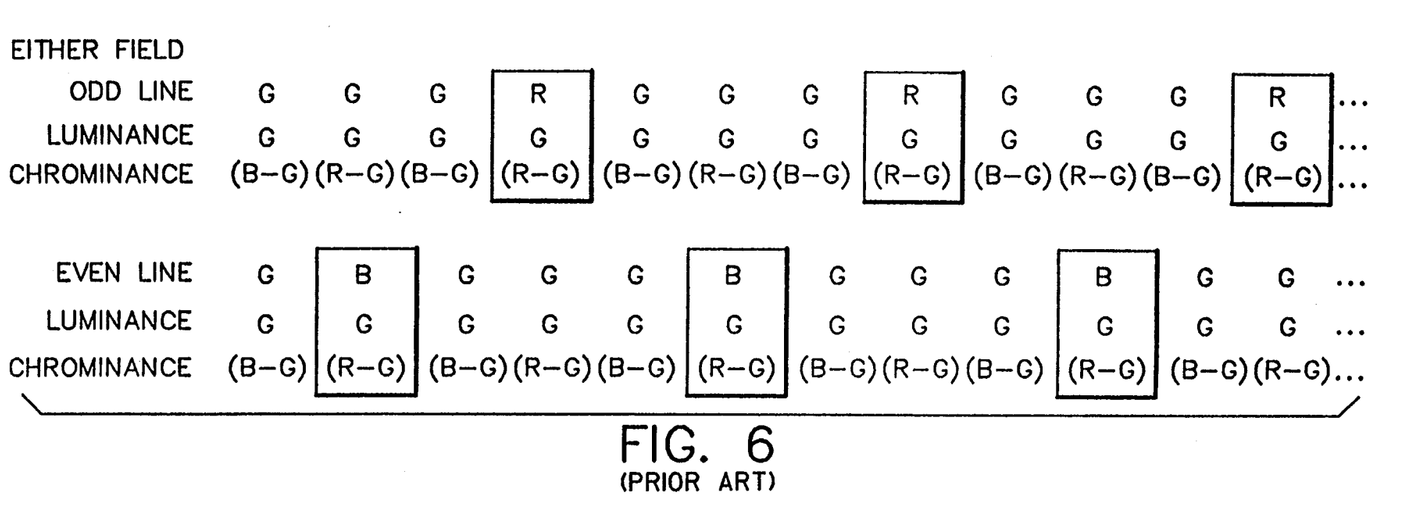
FIG. 6 illustrates the generation of luminance and chrominance information using the color filter array of the type illustrated in FIG. 5.

A similar problem is experienced with other conventional CFA patterns. For example, FIG. 3 illustrates a conventional Field Staggered 3-G CFA that is similar to the 3-G CFA illustrated in FIG. 1. In the Field Staggered 3-G CFA, however, the red and blue filter locations are staggered between image fields. In this case, the odd field lines of both image fields would still be properly aligned with the required interleaved chrominance channel pattern. The blue filter locations of the even image lines of both fields, however, are not aligned as illustrated in FIG. 4. FIG. 5 illustrates still another conventional CFA pattern referred to as a Staggered 3-G CFA, wherein the red and blue filter elements are aligned between fields but are offset from one another. Again, the odd field lines of both fields are properly aligned with the required interleaved chrominance channel pattern, but the even field lines of both fields are not aligned as illustrated in FIG. 6.

Figure 7:
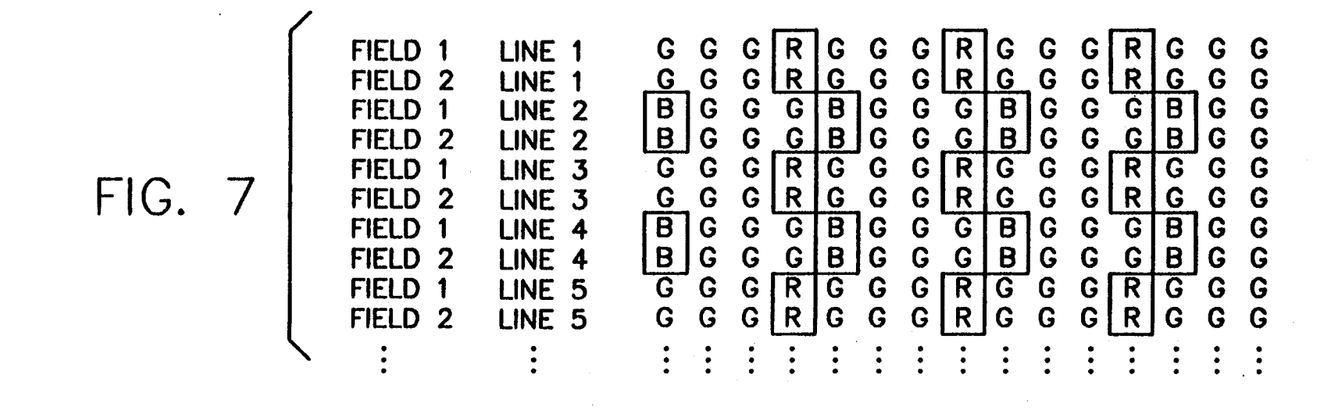
FIG. 7 illustrates a color filter array, referred to as a "Dithered 3-G" color filter array, in accordance with a first embodiment of the invention.
Figure 8:
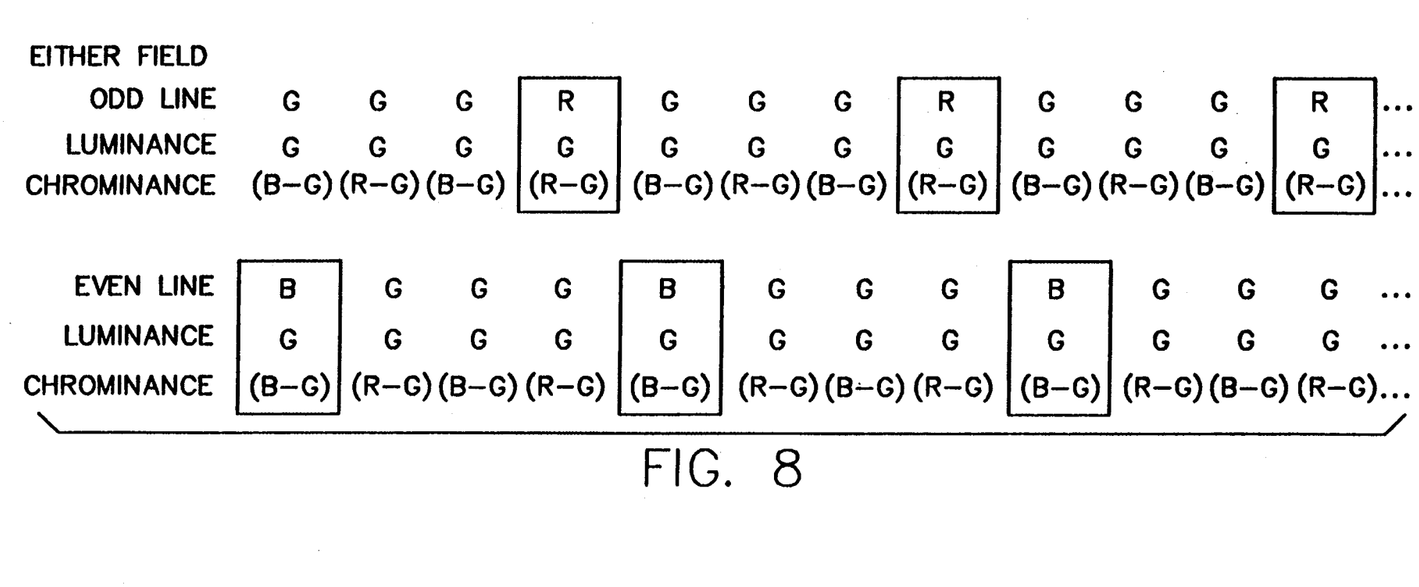
FIG. 8 illustrates the generation of luminance and chrominance information using the color filter array illustrated in FIG. 7.

Referring now to FIG. 7, a CFA in accordance with the present invention is shown in which the red filter elements and the blue filter elements are offset in a dithered pattern such that the red and blue filter elements will always fall within the required interleaved chrominance channel pattern. In the dithered 3-G pattern shown in FIG. 7, the red filter elements and the blue filter elements are each vertically aligned from one field to the other field, but are each horizontally offset by one filter element within each field in order to fall within the interleaved chrominance channel pattern. For example, as shown in FIG. 8, the red filter elements align in a manner similar to the red filter elements of the 3-G CFA illustrated in FIG. 1. The blue filter elements, however, also align with the interleaved chrominance channel pattern so that the actual blue values generated by the photosites of the image sensor that correspond to the blue filter elements are used, thereby avoiding the requirement for the interpolated color values as in the case of the conventional 3-G CFA illustrated in FIG. 1.

Figure 9:
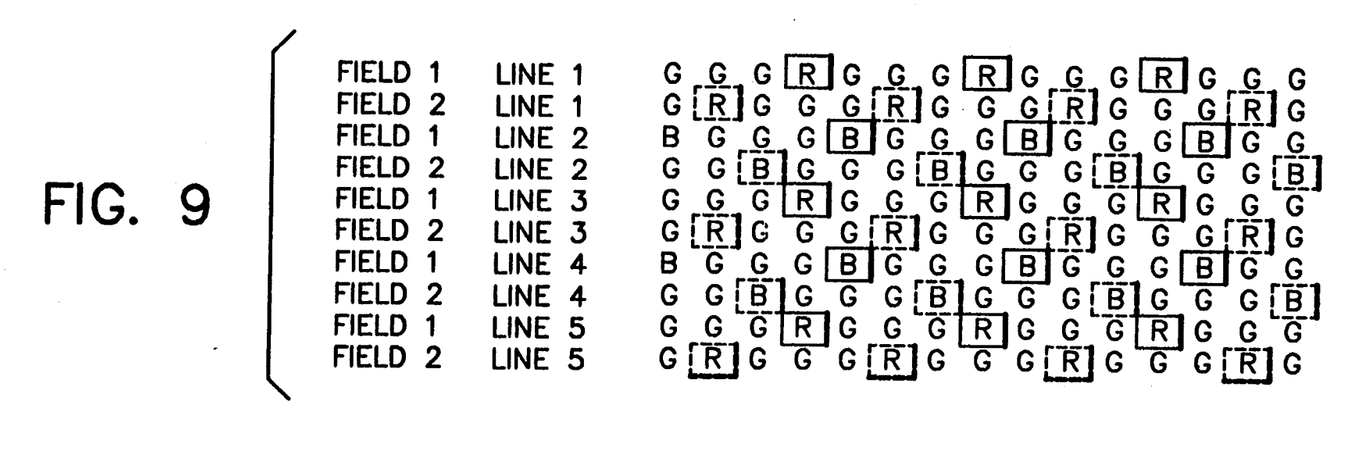
FIG. 9 illustrates a color filter array, referred to as a "Field Staggered Dithered 3-G" color filter array, in accordance with a second embodiment of the invention.
Figure 10:
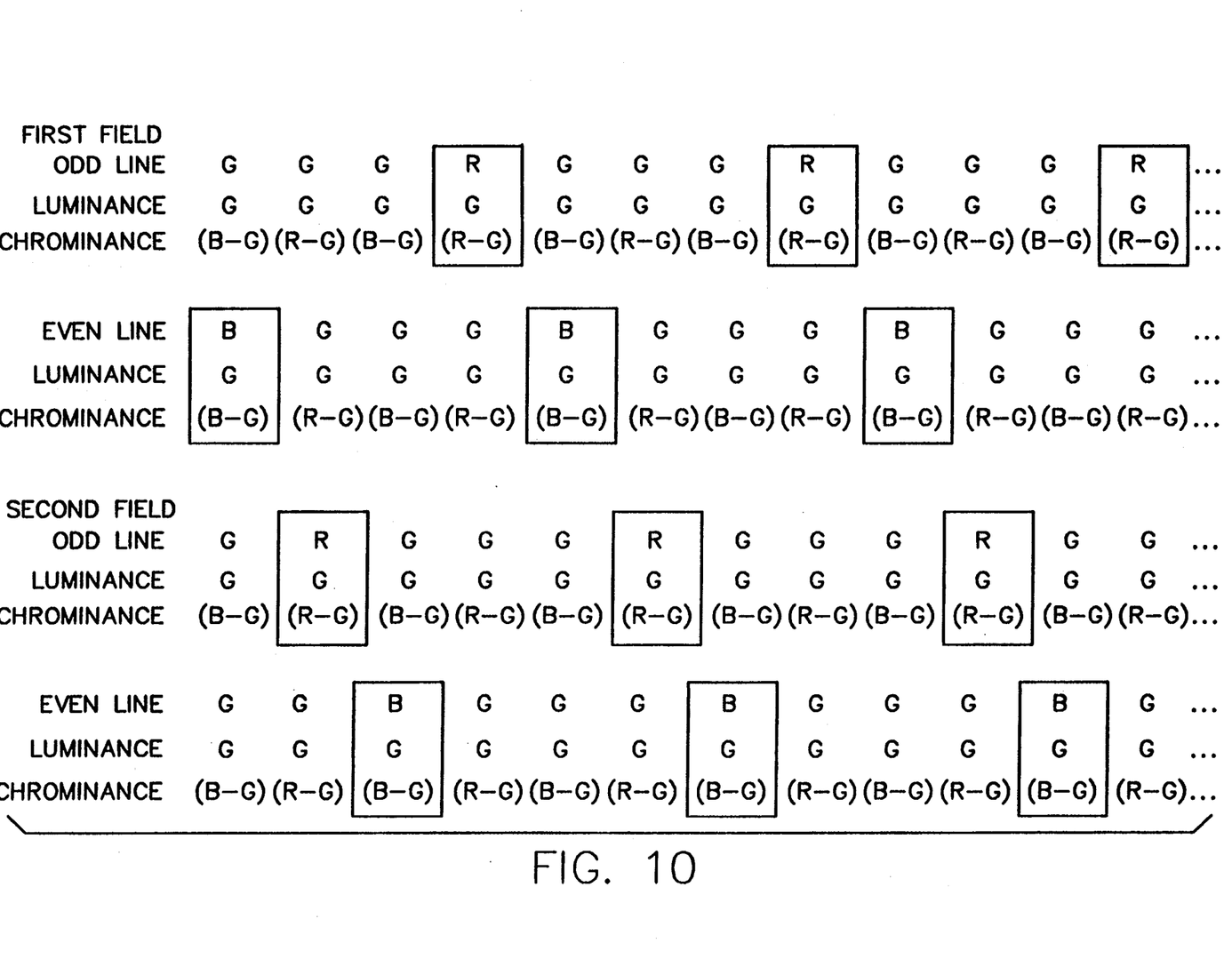
FIG. 10 illustrates the generation of luminance and chrominance information using the color filter array illustrated in FIG. 9.
Figure 11:
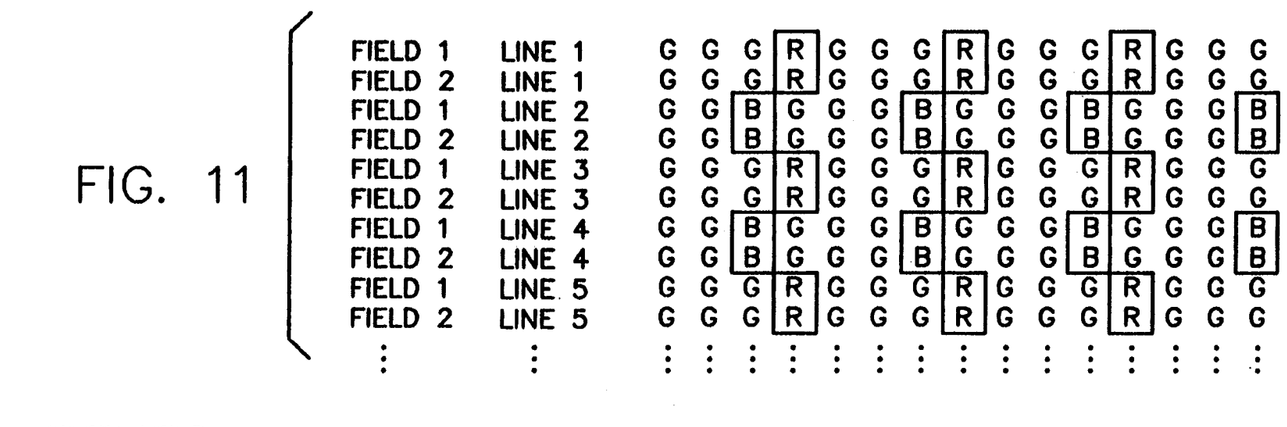
FIG. 11 illustrates a color filter array, referred to as a "Dithered 3-G Variant" color filter array, in accordance with a third embodiment of the invention.
Figure 12:
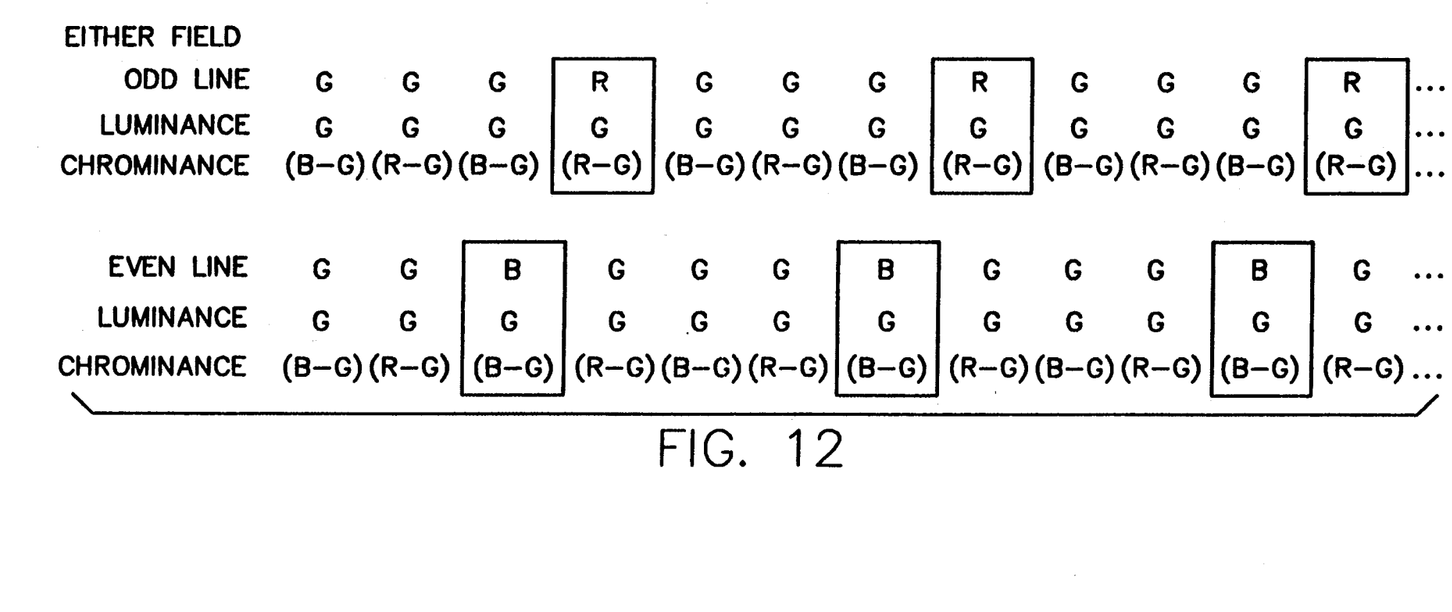
FIG. 12 illustrates the generation of luminance and chrominance information using the color filter array illustrated in FIG. 11.

Other CFA patterns in accordance with the invention are illustrated in FIGS. 9 and 11. FIG. 9 is a variation of the conventional Field Staggered CFA illustrated in FIG. 3, and is referred to as the Field Staggered Dithered 3-G CFA. FIG. 11 illustrates a Dithered 3-G Variant CFA. The generation of the luminance signals and chrominance signals for both arrays are respectively illustrated in FIGS. 10 and 12.

It should be understood that the illustrated CFAs are only representative examples and the invention is not limited to the specifically disclosed patterns. The only requirement is that the patterns conform to the desired interleaved chrominance channel pattern. In addition, while the disclosed interleaved chrominance channel pattern begins with a B-G value, the chrominance channel pattern could also begin with a R-G value.

Figure 13:
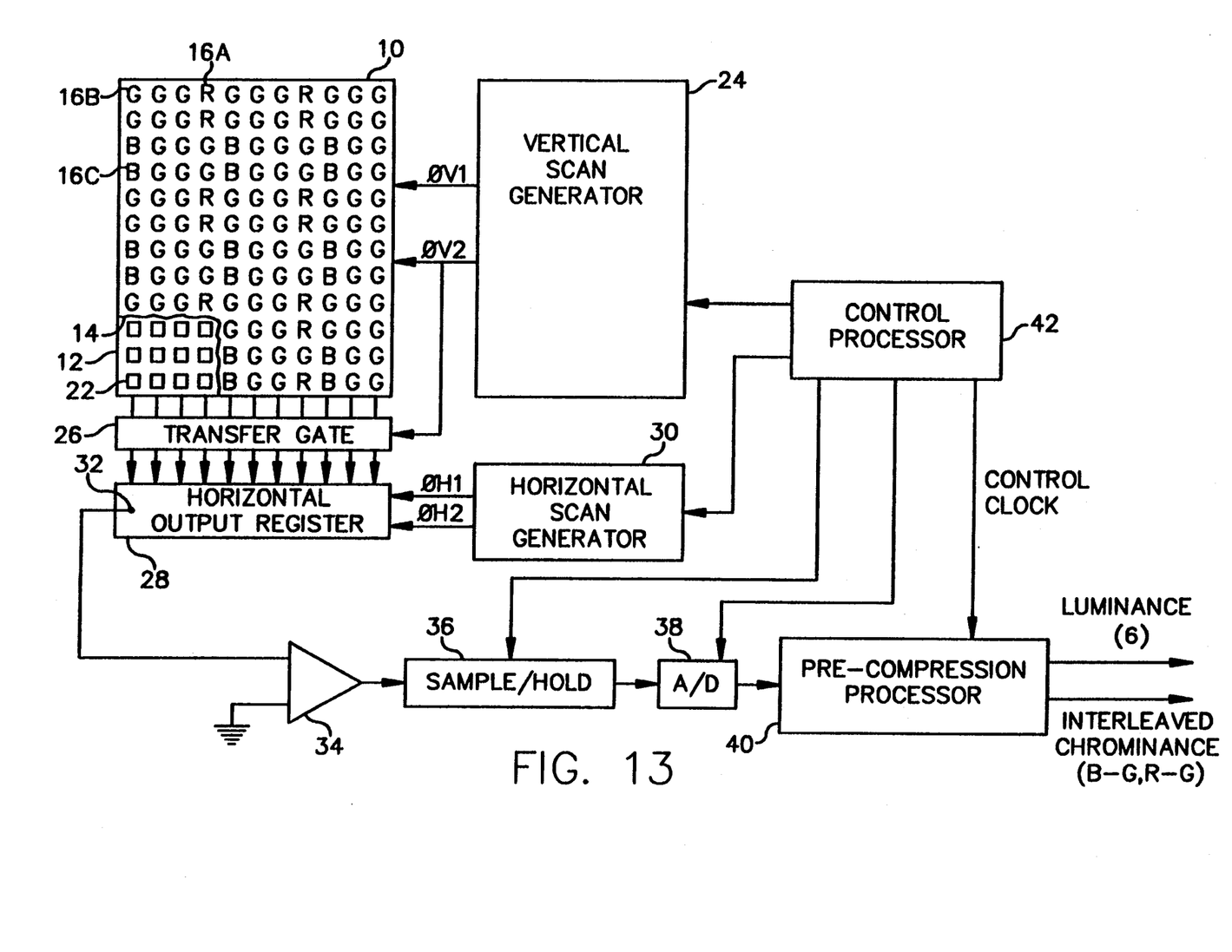
FIG. 13 illustrates an electronic camera including an image sensor incorporating the color filter array illustrated in FIG. 7.

An electronic camera incorporating the invention is illustrated in FIG. 13. A CFA 10 is shown overlying a charge-coupled image sensor 12 (for example a KAF-1400 1320×1035 element full frame CCD imager manufactured by Eastman Kodak Company of Rochester, N.Y.) which, for purposes of illustration, is shown through a cut-away portion 14 of the CFA 10. The CFA 10 has a plurality of red, green and blue elements 16a, 16b, 16c, arranged in accordance with the CFA pattern illustrated in FIG. 7. The color filter elements 16a, 16b, 16c cover a plurality of photosites 22 on the image sensor 12. Image light striking the sensor 12 is integrated at the photosites 22. In the illustrated example, the electronic camera is a still video camera in which image light is controlled by an optical shutter (not shown) which is opened to permit image light to impinge on the image sensor for a predetermined exposure period. The shutter is then closed and the image charge accumulated in the photosites 22 of the image sensor 12 is read out.

A vertical scan generator 24 generates clock phase signals $\phi V1$ and $\phi V2$ for controlling image integration and vertical transfer to a transfer gate 26 via conventional two-phase complementary clocking. The image charge is then transferred, one row at a time, through the transfer gate 26 to a high-speed horizontal output register 28. A horizontal scan generator 30 is provided to generate horizontal clocking signals $\phi H1$ and $\phi H2$ which are supplied to the horizontal output register 28. An output capacitive node 32 produces a signal which is amplified by an output amplifier 34 prior to being clamped by a sample/hold circuit 36. The signal clamped by the sample/hold circuit 36 is then converted to a digital signal by an analog-to-digital (A/D) converter 38. The digital signal generated by the A/D converter 38 is then supplied to a pre-compression processor 40 which converts the digital data stream supplied by the A/D converter 38 to a luminance channel output (G) and a interleaved chrominance channel output (B-G, R-G) which can then be supplied to a standardized image compression processing circuit. Overall operation of the pre-compression processor 40 is controlled by a control processor 42, for example a microprocessor, which also controls the operation of the vertical scan generator 24, the horizontal scan generator 30, the sample/hold circuit 36 and the A/D converter 38.

Figure 14A:
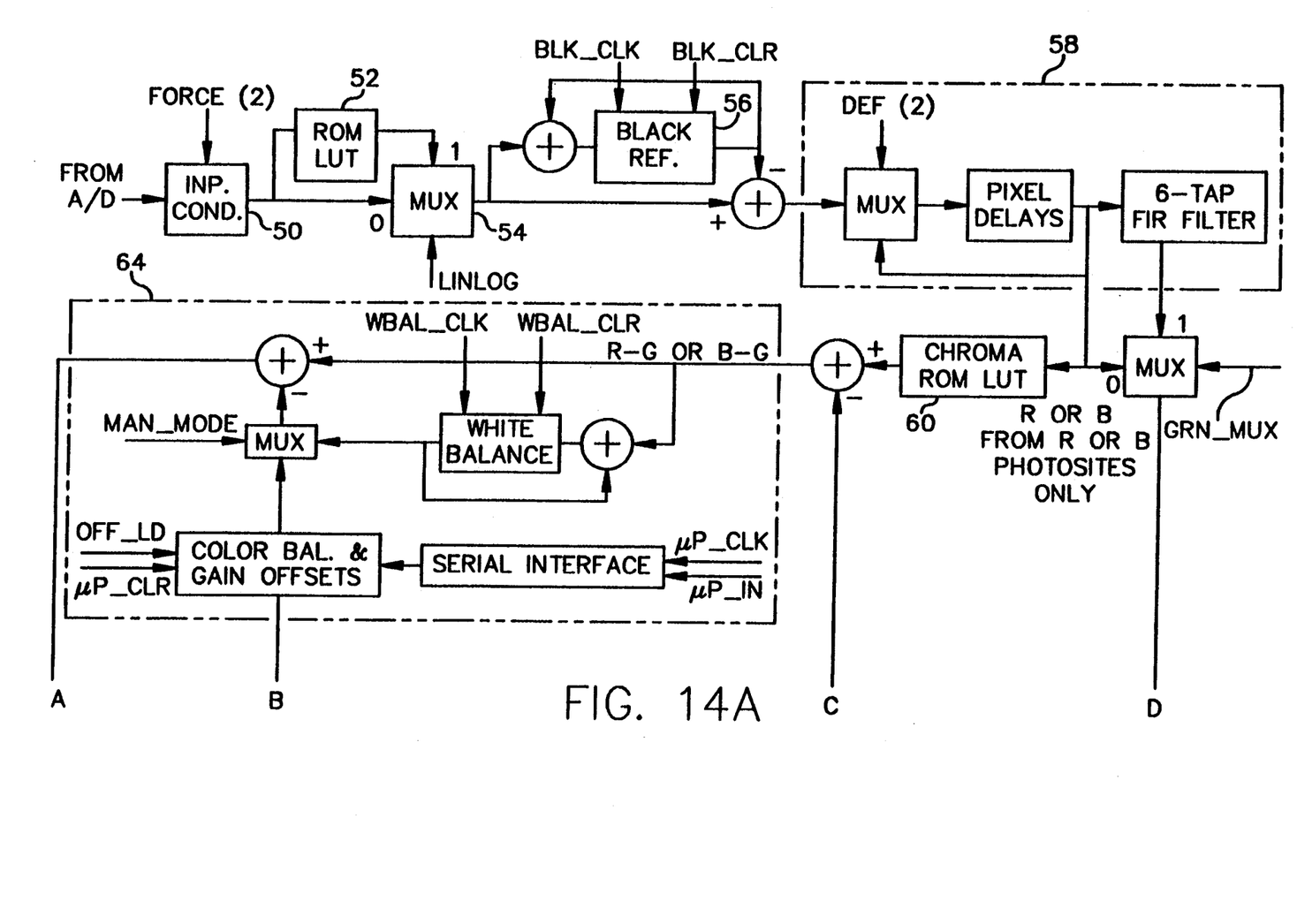
Figure 14B:
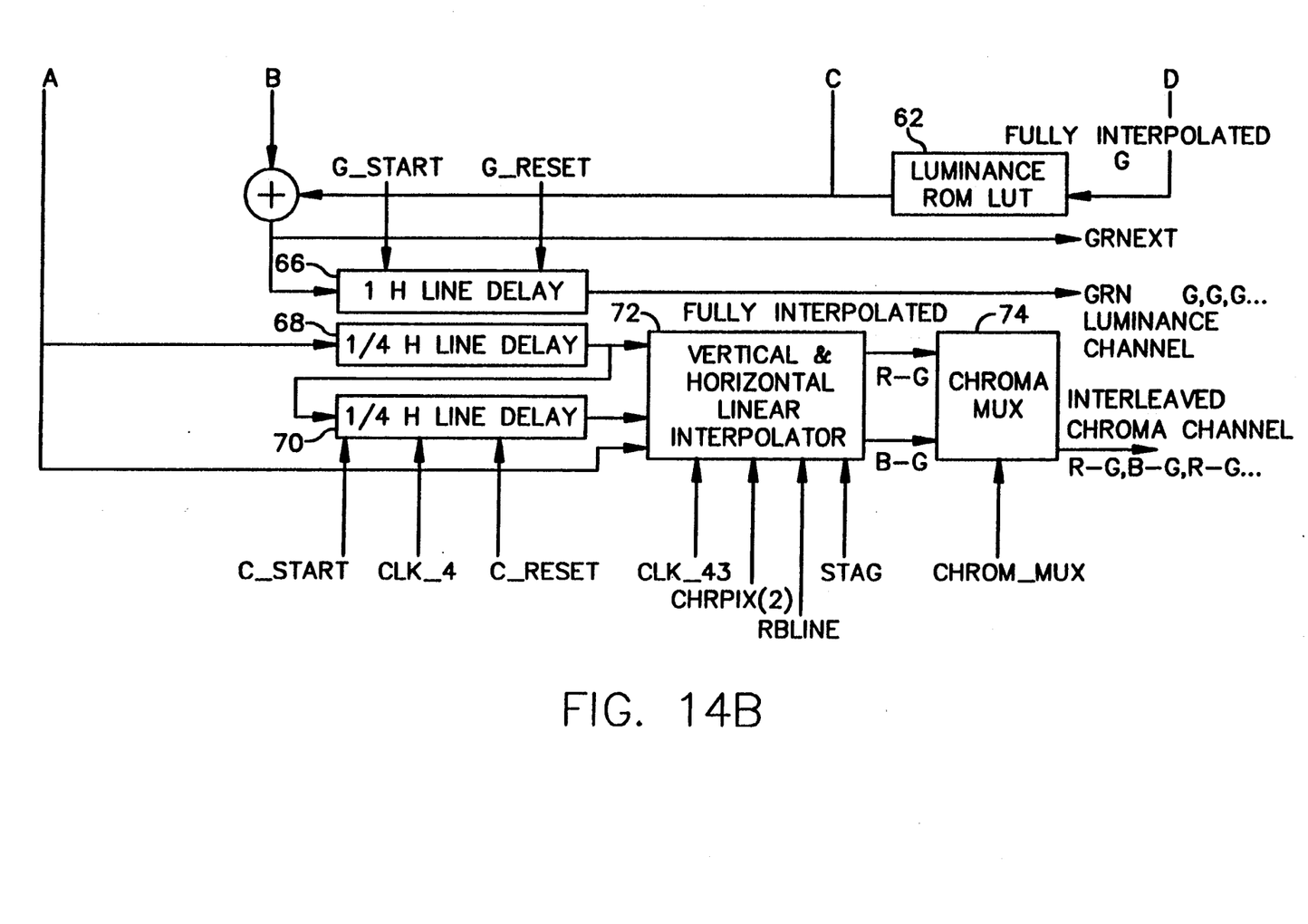

A detailed schematic diagram of the pre-compression processor is illustrated in FIG. 14. The output from the A/D converter 38 is supplied to an input conditioning circuit 50. The output of the input conditioning circuit 50 is supplied to a linear-to-log look-up-table 52 (LUT) and a multiplexer 54. The output from the multiplexer 54 is supplied to a black reference clamp circuit 56. The output of the black reference clamp circuit 56 is supplied to a sensor defect correction and missing green pixel interpolator circuit 58. Signals from red and blue photosites are subsequently supplied to a chrominance LUT 60 while the signals from the green photosites are supplied to a luminance LUT 62. After passing through a white balance circuit 64, the red, green and blue signals are passed through appropriate line delays 66-70 before the green luminance channel is output and the red and blue signals are applied to a vertical and horizontal linear interpolator 72. The output from the vertical and horizontal linear interpolator 72 is multiplexed by a chrominance multiplexer 74 to generate the interleaved chrominance channel. The various control signals and clocking signals illustrated in FIG. 14 are generated by the control processor 42.

It will be understood that the invention has been described with reference to certain preferred embodiments thereof. Modifications and variations are possible, however, within the scope of the appended claims. As was mentioned above, the possible CFA patterns are not limited to those specifically disclosed and discussed. In addition, the circuitry of the pre-compression processor 40 can be varied from the specifically illustrated embodiment. For example, the black reference and white balance circuits can be removed from the pre-compression processor. In addition, the invention is not limited to electronic imaging apparatus in which the precompression processor is incorporated within a camera structure.

Industrial Utility

The invention is useful in any type of electronic imaging apparatus that utilizes a single image sensor, incorporating a CFA, to generate luminance and chrominance information.

What is claimed:

1. An electronic imaging apparatus comprising: an electronic image sensor including a plurality of photosites arranged in two fields in a two-dimensional array; a color filter array including a Dithered 3-G (three green) pattern of red, green and blue filter elements located over the two-dimensional array of photosites, wherein the red and blue filter elements from one field are each vertically aligned to respective red and blue elements in the other field, and the red and blue filter elements in adjacent lines within each field are horizontally offset by one filter element with respect to each other, so as to correspond to a predetermined interleaved chrominance channel pattern; and means for scanning the image sensor to generate an image output signal.

2. An electronic imaging apparatus as claimed in claim 1, further comprising processing means for processing the image output signal to generate a luminance signal and an interleaved chrominance signal corresponding to the interleaved chrominance channel pattern.

3. An electronic imaging apparatus as claim in claim 1, wherein rows of the Dithered 3-G pattern corresponding to each of the first and second image fields alternate between a 3G-1R-3G-1R pattern and a 1B-3G-1B-3G pattern.

* * * * *